Figure 1:
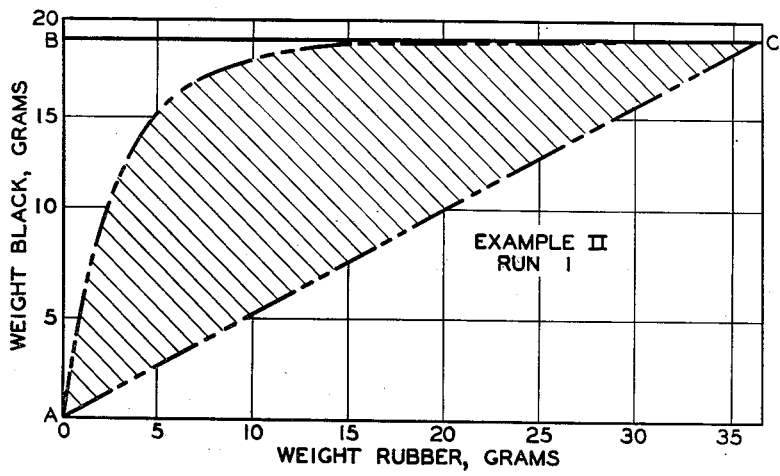

EFFECT OF VARIATION OF CAUSTIC LEVEL IN PREPARATION
OF BLACK SLURRIES AT 5 phb ROSIN SOAP LEVEL EFFECT OF VARIATION OF ROSIN SOAP LEVEL IN PREPARATION
OF BLACK SLURRIES AT CONSTANT KOH/SOAP RATIO

United States Patent Office 3,021,226
Patented Feb. 13, 1962

3,021,226
CARBON BLACK SLURRIES AND LATEX-CARBON BLACK MASTERBATCHES
Gerard Kraus and Kent W. Rollmann, Bartlesville, Okla., assignors to Phillips Petroleum Company, a corporation of Delaware
Filed June 2, 1958, Ser. No. 739,412
11 Claims. (Cl. 106—238)

In one aspect this invention relates to uniform coagulation of latex-carbon black masterbatches. In another aspect the invention relates to carbon black slurries containing a rosin acid soap, and their preparation.

This application is a continuation-in-part of Serial No. 642,288, filed February 25, 1957, and now abandoned.

Variable amounts of carbon black are used in rubber compositions and one method for its incorporation into rubber is the latex masterbatching process. This procedure eliminates separate handling and incorporation of large amounts of carbon black in compounding the rubber, a disagreeable operation. The process comprises preparation of an aqueous carbon black slurry, mixing it with a rubber latex, and breaking the emulsion by addition of a coagulating agent to provide a mixture of coagulated rubber containing dispersed black.

The usual method of coagulating a latex-carbon black mixture has been to use a brine-acid or a glue-acid coagulation system, the coagulant being added to the mixture or vice versa. In normal operation, the masterbatch frequently contains small, hard undispersible particles which consist of rubber containing a high percentage of carbon black. These small particles protrude from the surrounding material during tubing or calendering of the compounded stock. Various suggestions have been made for the treatment of the masterbatch in order to eliminate the problems caused by these hard particles. These suggestions involve additional handling of the composition such as extruding it through a small orifice or milling the product following coagulation. Even with this special treatment, the hard particles frequently fail to disperse in the composition and a homogenous product is not obtained.

A dispersing agent commonly used in the preparation of carbon black slurries is sodium lignin sulfonate although other dispersing agents such as alkyl aryl sulfonates, alkali metal salts of formaldehyde-naphthalene sulfonic acid condensation products, and the like, are considered applicable. The amount of dispersing agent frequently considered sufficient for a satisfactory slurry is around 2 to 5 parts by weight per 100 parts of carbon black. A small quantity of an alkali metal hydroxide is frequently employed in the dispersion.

We have discovered a method of obtaining a substantially uniform coagulation of latex and the carbon black. The method comprises, broadly, providing in the mixture of black and latex, based upon 100 parts by weight of rubber and black, at least 8 parts or rosin soap or fatty acid soap and at least 0.25 part by weight of an alkali metal hydroxide. When the resulting mixture is coagulated by conventional means, the product obtained is substantially free of the hard, small, indispersible particles previously described. More specifically, we operate with an amount of rosin soap or fatty acid soap in the range between 8 and 15 grams per 100 grams of rubber plus carbon black and an amount of alkali metal hydroxide in the range of 0.25 to 1, preferably 0.35 to 0.7 part, per 100 parts by weight of rubber plus carbon black. A homogeneous composition results upon the addition of a coagulant. Obviously, larger amounts of soaps can be used than the preferred range, but such operation necessitates the use of excessive quantities of coagulant without improving the quality of the masterbatch. Frequently, secondary anionic and nonionic dispersing agents such as alkyl aryl sulfonates, alkyl sulfates and sulfonates, alkali metal lignin sulfonates, condensation products of formaldehyde with aryl sulfonic acids, etc. are used in the polymerization recipe. It is preferred, however, that the amount of such secondary dispersing agent not exceed 0.5 weight percent based on the rubber and black.

Because of the superior properties imparted by a carbon black slurry prepared with a rosin acid soap, when compounded in rubber, rather than with other types of dispersing agents, rosin acid soaps are often preferred when preparing a carbon black slurry for masterbatching with rubber. However, a difficulty which has retarded the use of such carbon black slurries is the very troublesome foaming of such slurries during preparation and subsequent handling.

We have now found a method for preparing carbon black slurries with little or no foaming using a rosin acid soap as the dispersing agent which comprises mixing the carbon black and water in the presence of at least 5 parts by weight of a rosin acid soap and at least 0.2 part by weight of an alkali metal or ammonium hydroxide, preferably at least 0.3 part by weight, per 100 parts of the carbon black. The amount of water employed in the recipe is usually sufficient to give a carbon black slurry having a solids content in the range between 8 and 20 weight percent. The mixture is subjected to mild agitation until all of the black has been wetted and the solids content of the slurry has leveled off to a constant value. Such carbon black slurries also have a very reduced tendency to foam in subsequent handling. Another difficulty solved by the method is that the extremely high viscosity of the slurries prepared in the past using a rosin acid soap is also overcome by the process and composition of the invention. Such slurries are very advantageously employed in that process of the present invention which comprises preparing a uniform coagulum of a latex-carbon black masterbatch.

The following are objects of this invention:
An object of this invention is to provide improved rubber-carbon black masterbatches. A further object of this invention is to provide an improved method for the preparation of rubber-carbon black masterbatches.

Other objects and advantages of this invention will become apparent to those skilled in the art upon reading the accompanying disclosure which includes a drawing comprising—

Figure 2:
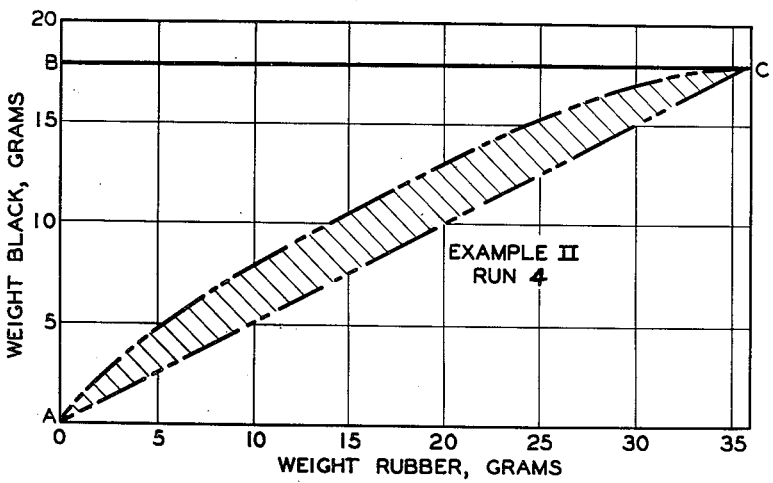
Figure 3:
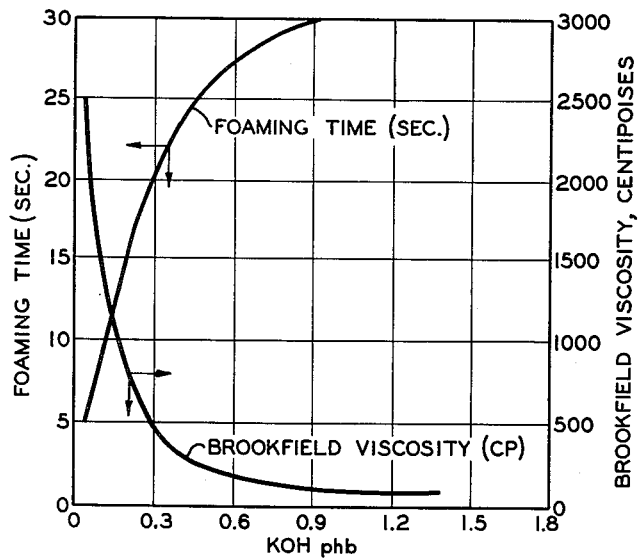
Figure 4:
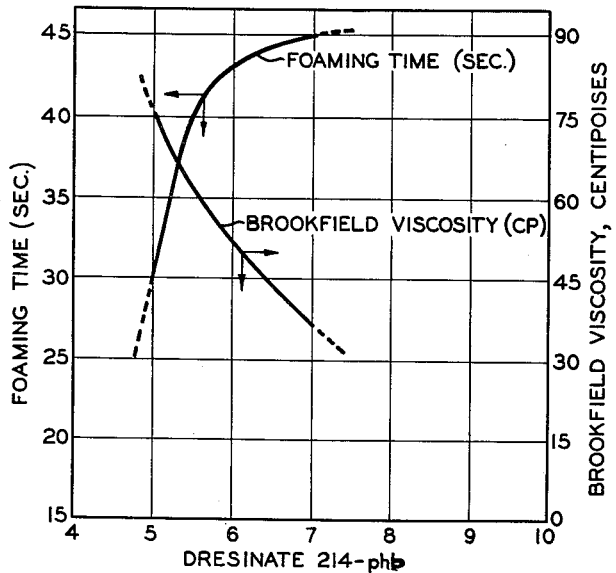

FIGURE 1, a graph showing non-uniform coagulation of the prior art described fully hereinafter, FIGURE 2, showing the uniform coagulation obtained by operation according to our improved method, FIGURE 3, a graph showing the effect of variation in caustic level in the preparation of rosin acid soap-carbon black slurries, and FIGURE 4, showing the effect of variation of rosin acid soap level in the preparation of rosin acid soap-carbon black slurries.

Our operation, for obtaining uniform carbon black-rubber coagulation, comprises, in one modification, using a conventional amount of rosin soap or fatty acid soap in the production of the rubber latex, i.e., around 4 to 5 parts by weight of soap per 100 parts of monomers charged. The remainder of the soap, along with the requisite amount of alkali metal hydroxide, is employed in the preparation of the carbon black slurry. Alternatively, a portion of the alkali can be used in the polymerization recipe. Carbon black slurries prepared using a considerable amount of the total dispersing agent employed in the system are less viscous and have greater stability than slurries made with water alone. They are, therefore, more convenient to handle. It is not mandatory that all the dispersing agent which is not employed in preparation of the rubber latex be present in the carbon black slurry. Whatever amount that is not used can be added to the latex after it is prepared or to the mixture of latex and carbon black slurry prior to coagulation. It is preferred to use at least 5 parts by weight of rosin soap or fatty acid per 100 parts of carbon black in the slurry.

One procedure which can be employed is to use a major portion of the soap, or even all of it, in the polymerization recipe. The soap which remains, if any, is used in preparation of the carbon black slurry.

It can be seen that numerous variations can be introduced when operating in accordance with the process of this invention so long as the required amounts of rosin soap or fatty acid soap and alkali metal hydroxide are present in the mixture of rubber latex and carbon black prior to coagulation.

It has been previously pointed out that one difficulty which arises when coagulating a conventional rubber latex-carbon black mixture is that small, hard particles consisting of rubber containing a large amount of carbon black are present in the composition. The non-uniformity of such a product is the result of a step-wise coagulation of the materials forming the masterbatch. If, for example, a butadiene/styrene copolymer latex is mixed with carbon black and the mixture is fractionally coagulated by separate additions of sulfuric acid in amounts insufficient to break the emulsion completely, the first fractions will contain more black than those coagulated later. This lack of uniformity in coagulation is termed differential coagulation. The method of the present invention minimizes differential coagulation, i.e., it promotes co-coagulation of rubber with carbon black.

This invention is applicable to synthetic rubbers prepared by emulsion polymerization in an alkaline medium. This obviously, includes substantially all of the well known polymers based upon polymerization recipes where homopolymers of conjugated dienes are used or where copolymers are prepared by polymerizing a major amount of a conjugated diene and a minor amount of another monomer. While the most common diene in use at present is 1,3-butadiene, other conjugated dienes containing not over 8 carbon atoms are suitable and mixtures of these dienes can be used. Other common dienes include 2,3-dimethyl-1,3-butadiene, isoprene, piperylene, 3-methoxy-1,3-butadiene, 4-methyl-1,3-hexadiene, and 2-chloro-1,3-butadiene. The list of monomers copolymerizable therewith is almost without limit but representative compounds include aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, such as acrylic acid, methacrylic acid, methyl acrylate, ethyl acrylate, methyl alpha-chloroacrylate, methyl methacrylate, ethyl methacrylate, butyl methacrylate, methyl ethacrylate; nitriles such as acrylonitrile, methacrylonitrile; amides such as methacrylamide, and the like; methyl isopropenyl ketone; methyl vinyl ketone; methyl vinyl ether; vinylethinyl alkyl carbinols; vinylidene chloride; vinylfurane; vinylcarbazole; vinylacetylene and other unsaturated hydrocarbons, esters, alcohols, acids, ethers, etc., of the types described.

Likewise, the rosin soaps and fatty acid soaps are those well known in the art. The rosin soaps are prepared from rosin acids by treatment with potassium hydroxide. The rosin acids can be obtained from any source, for example, from wood, gums, etc., and can be used as such or treated in various ways to effect purification. Broadly, they are the natural rosin acids and disproportionation reaction products thereof having the same number of carbon atoms per molecule and the same arrangement of carbon atoms as the natural rosin acids. The disproportionated rosin acids, that is, rosin acids treated in such a way that selective dehydrogenation and hydrogenation occur, are particularly effective. Specific examples of rosin acid components which are applicable are abietic acid and dehydro-, dihydro-, and tetrahydroabietic acids. Materials found to be particularly effective are the potassium salt of tetrahydroabietic acid and mixtures of potassium salts of dehydro-, dihydro-, and tetrahydroabietic acids. One particularly advantageous soap of this nature is commercially available as Dresinate S–134 and another is Dresinate 214. Soaps of fatty acids containing 10 to 20 carbon atoms are preferred in the practice of our invention. These include capric, lauric, dodecylenic, myristic, palmitic, plamistroleic, stearic, oleic, ricinoleic, linoleic, linolenic, elestearic, and arachidic. Furthermore, mixtures of soaps can be used including mixtures of rosin soaps with fatty acid soaps.

All of the alkali metal and ammonium salts of these acids are suitable although we prefer to use the sodium and potassium soaps.

The alkali metal hydroxide can be the hydroxide of any of the known alkali metals although, because of their availability, we prefer to use sodium and potassium hydroxides. When an alkali metal hydroxide is used in preparing the carbon black slurry, it need not be the same alkali metal hydroxide used in the polymerization recipe.

The lack of uniformity of product when a latex-carbon black masterbatch is coagulated in a step-wise manner can be readily demonstrated by reference to the coagulation data which follow. In the first series of runs, each test portion was prepared from 162 cc. of a butadiene/styrene copolymer latex (4.5 parts Dresinate 214/100 parts monomers; 7.5 parts Dresinate 214/100 parts rubber) and a slurry containing 17.8 grams of carbon black, (containing 5 parts Dresinate 214 and 0.2 part KOH/100 parts black) to give a loading of 52.1 grams of black per 100 grams of rubber. In the second series of runs, 170 cc. of the same latex was used with 19 grams of black (containing 15 parts Dresinate 214 and 1 part KOH/100 parts black) to give a loading of 49.9 grams of black per 100 grams of rubber. In the preparation of the carbon black slurries no difficulty was encountered with foaming of the slurries.

| Carbon black phr.[1] | Total (ph(r+b))[2] Dispersing Agent | Total (ph(r+b))[2] KOH | Coagulant added[3] ml. | Weight M.B.[4] precip., grams | Black analysis, weight percent |
|---|---|---|---|---|---|
| 52.1 | 6.6 | 0.17 | 10 | 25.2 | 70.2 |
|  |  |  | 25 | 29.6 | 60.5 |
|  |  |  | 50 | 33.4 | 53.7 |
|  |  |  | 75 | 37.3 | 48.5 |
|  |  |  | 100 | 44.2 | 42.2 |
|  |  |  | 125 | 49.8 | 38.1 |
| 49.9 | 10 | 0.44 | 10 | 0 | 0 |
|  |  |  | 25 | 13.8 | 50 |
|  |  |  | 50 | 15.0 | 40.7 |
|  |  |  | 75 | 23.4 | 41.0 |
|  |  |  | 100 | 29.9 | 38.5 |
|  |  |  | 150 | 44.9 | 35.4 |

[1] Phr=Parts by weight per 100 parts rubber.
[2] Ph(r+b)=Parts by weight per 100 parts rubber plus black.
[3] Coagulant was 0.5 weight percent sulfuric acid.
[4] M.B.=masterbatch.

These data show that in the first series of runs there is a much wider spread in carbon black analysis in the different portions coagulated than there is in the second series of runs, which contain an amount of emulsifier within the limits of our invention.

A convenient method of expressing the uniformity or extent of co-coagulation of rubber with carbon black from a latex masterbatch is in terms of the differential coagulation index. This value is determined by adding variable quantities of a coagulant such as sulfuric acid to separate portions of a latex masterbatch as described above. From the weight of the crumb preceipitated and the carbon black analysis, the weights of black and rubber are computed and a graph plotting black vs. rubber is constructed. FIGURES 1 and 2 show graphs constructed using the above data. These are runs 1 and 4 of Example II in which run 1 has a differential coagulation index of 0.86 and run 4 has a differential coagulation index of 0.24. The straight line AC in each figure represents ideal co-coagulation while the curved line represents actual results. The shaped area divided by the area ABC gives the differential coagulation index. The lower the differential coagulation index, the better the product. It is desirable to keep the differential coagulation index below 0.5 preferably below 0.25. A value of zero represents an ideal situation and 1 represents complete separation of black and rubber.

A substantially uniform dispersion of rubber and carbon black can be obtained from any latex by operating in accordance with the process of this invention. It is important that the dispersing agent be either a rosin soap or a fatty acid soap. Mixtures of fatty acid soaps with rosin soaps are also applicable. Comparable results are not obtained with other types of dispersing agents. When sodium lignin sulfonate, for example, is used in place of the rosin soap in an otherwise comparable system, the differential coagulation index is higher and some of the rubber properties are affected adversely, the modulus, tensile strength, and resilience being decreased and the heat build-up and abrasion loss being increased. These results are apparent by reference to Example I. When dispersing agents such as alkyl aryl sulfonates are employed in amounts which are applicable in the present process, coagulation of the masterbatch is frequently very difficult. In some instances, very little, if any coagulation occurs even if much larger amounts of coagulating agents are used than are ordinarily required.

EXAMPLE I

Butadiene was copolymerized with styrene in accordance with the following polymerization recipes:

|  | Parts by weight | |
|---|---|---|
|  | A | B |
| Water | 180 | 180 |
| Butadiene | 72 | 72 |
| Styrene | 28 | 28 |
| Rosin soap, K salt [1] | 5 | 10 |
| KOH | 0.1 | 0.1 |
| KCl | 0.4 | 0.4 |
| Daxad 11 [2] | 0.1 | 0.1 |
| FeSO$_4$.7H$_2$O | 0.01 | 0.01 |
| Sequestrene AA [3] | 0.02 | 0.02 |
| NaSO$_2$CH$_2$OH.2H$_2$O [4] | 0.05 | 0.05 |
| p-Menthane hydroperoxide | 0.05 | 0.05 |
| tert-Dodecyl mercaptan | Variable | Variable |
| Shortstop: Di-tert-butylhydroquinone | 0.15 | 0.15 |
| Antioxidant (phr.): [5] PBNA [6] | 1.5 | 1.5 |
| Polymerization temperature, °F | 41 | 41 |

[1] Dresinate 214.
[2] Sodium salt of the condensation product with formaldehyde of a short chain-alkylnaphthalene sulfonic acid.
[3] Ethylenediamine tetraacetic acid.
[4] Sodium formaldehyde sulfoxylate.
[5] Phr.=parts by weight per 100 parts rubber.
[6] Phenyl-beta-naphthylamine.

Results of 5 runs were as follows:

| Run No. | Polymerization recipe | Soap solution, pH | Time, hours | Conversion, percent | tert-Dodecyl mercaptan part | Mooney (ML-4) | |
|---|---|---|---|---|---|---|---|
|  |  |  |  |  |  | Stripped | Blend |
| 1 | A | 10.1 | 13.7 | 60 | 0.26 | 36 | 49 |
| 2 | A | 10.4 | 5.8 | 61 | 0.21 | 76 | 63 |
| 3 | A | 9.8 | 11.8 | 61 | 0.23 | 54 |  |
| 4 | B | 10.4 | 15.8 | 59 | 0.21 | 76 | 66 |
| 5 | B | 9.6 | 9.7 | 63 | 0.25 | 50 |  |

[1] Initiator booster added at 23 percent conversion.
[2] Initiator booster required to initiate polymerization.

Four carbon black slurries (Philblack O, high abrasion furnace black) were prepared using the following recipes:

|  | Parts by weight | | | |
|---|---|---|---|---|
|  | A | B | C | D |
| Water | 900 | 900 | 900 | 900 |
| Philblack O | 100 | 100 | 100 | 100 |
| Rosin soap, K salt [1] | 15 | 5 | 5 |  |
| Marasperse CB [2] |  |  |  | 15 |
| NaOH | 1 | 1 | 0.3 | 1 |

[1] Dresinate 214.
[2] Sodium lignin sulfonate.

The following slurry data were obtained:

| Slurry recipe | Dispersing agent | Brookfield viscosity, cp. | Final slurry pH | Solids percent |
|---|---|---|---|---|
| A | Dresinate 214 | 5 | 11.6 | 9.8 |
| B | do | 99 | 11.7 | 10.5 |
| C | do | 64 | 10.3 | 10.7 |
| D | Marasperse CB | 5 | 11.0 | 11.8 |

In the preparation of slurries A, B, and C no difficulty with foaming was encountered.

Masterbatches of the rubber latex with carbon black were prepared using each of the slurries in sufficient amount to give a ratio of approximately 50 parts by weight of black per 100 parts rubber. Each latex-carbon black mixture was added with agitation to a 0.5 weight percent sulfuric acid solution to induce shock coagulation. A good crumb size was obtained except when 15 parts of Marasperse CB was used as the dispersing agent in the black slurry. The crumb was extremely fine in this sample. The masterbatch data are shown below, runs 1 and 2 illustrating our invention:

| Run No. | Rosin soap | | Alkali metal hydroxide | | Polymer Mooney (ML-4) | Recipe | Black slurry | | NaOH phb.[2] | Black in M.B.[3] phr.[1] | Parts dispersant in black used | Total parts dispersant per 100 parts rubber plus black | Parts NaOH in black used | Total parts NaOH per 100 parts rubber plus black | DCI[4] of M.B. |
|---|---|---|---|---|---|---|---|---|---|---|---|---|---|---|---|
|  | In poly. recipe | Phr.[1] | In poly. recipe | Phr.[1] |  |  | Dispersant | Phb.[2] |  |  |  |  |  |  |  |
|  |  |  |  |  |  |  | Type |  |  |  |  |  |  |  |  |
| 1 | 5 | 8.2 | 0.1 | 0.16 | 63 | A | Dresinate 214 | 15 | 1 | 53.6 | 8.04 | 10.6 | 0.54 | 0.46 | 0.23 |
| 2 | 10 | 16.4 | 0.1 | 0.16 | 66 | B | do | 5 | 1 | 47.5 | 2.37 | 12.7 | 0.43 | 0.43 | 0.19 |
| 3 | [5] 5 | 8.2 | 0.1 | 0.16 | 51 | C | do | 5 | 0.3 | 50.0 | 2.50 | 7.1 | 0.15 | 0.20 | 0.81 |
| 4 | 5 | 8.2 | 0.1 | 0.16 | 51 | B | do | 5 | 1 | 48.4 | 2.42 | 7.2 | 0.48 | 0.43 | 0.71 |
| 5 | 5 | 8.2 | 0.1 | 0.16 | 49 | D | Marasperse CB | 15 | 1 | 55.0 | 8.25 | 10.6 | 0.55 | 0.46 | 0.35 |

[1] Phr.=parts by weight per 100 parts rubber.
[2] Phb.=parts by weight per 100 parts black.
[3] M.B.=masterbatch; carbon black adjusted to 55 parts on the mill.
[4] DCI=Differential coagulation index.
[5] Control, standard preparation.

The differences in the product set forth in the table immediately above are, of course, apparent from the differences in the differential coagulation index and in the product evaluation which follows. These differences are also apparent in the photographs made with considerable magnification which are included with this application. These photographs form a part of this application and form a part of the official Patent Office records. The photographs are identified by the numbers 1 through 5 corresponding to run numbers 1 through 5 in the table immediately above. These photographs were made with an electron microscope at a magnification of 15,000 using specimens ½₀ of a micron in thickness. For these pictures, portions of the crumb were pressed into a sheet but not milled. Strips were cut from the sheet and slices of the desired thickness were cut after embedding the strips in a clear plastic. Photographs 1 and 2 illustrate masterbatches prepared according to the process of our invention. These photographs show uniform distribution of small, individual carbon black particles. Photographs 3 and 4 serve as a control wherein the emulsifier and so-

| | Parts by weight |
|---|---|
| Masterbatch | 155 |
| Philblack O | (¹) |
| Zinc oxide | 3 |
| Stearic acid | 1 |
| Flexamine ² | 1 |
| Circo-Para ³ | 10 |
| Sulfur | Variable |
| Santocure ⁴ | Variable |

¹ Added as necessary to adjust masterbatch to 55 phr. black.
² Physical mixture containing 65 percent of a complex diarylamine-ketone reaction product and 35 percent of N,N'-diphenyl-p-phenylenediamine.
³ A 50/50 mixture of Circosol–2XH with Para Flux.
  Circosol–2XH: A petroleum hydrocarbon softener containing hydrocarbons of high molecular weight, in the form of a heavy, viscous, transparent, pale green odorless liquid of low volatility; sp. gr. 0.940; Saybolt Universal viscosity at 100° F., about 2000 seconds.
  Para Flux: Saturated polymerized hydrocarbon.
⁴ N-cyclohexyl-2-benzothiazylsulfenamide.

The stocks were milled, cured 30 minutes at 307° F., and physical properties determined. Results were as follows:

| Dresinate 214 in latex parts | Black slurry Emulsifier Type | Black slurry Emulsifier Phb. | NaOH phb. | DCI² | Sulfur phr. | Santocure phr. | Compression set percent | 300% modulus p.s.i. | Tensile p.s.i. | Elongation percent | 200° F. maximum tensile p.s.i. | ΔT F. | Resilience percent | Flex life M³ | Shore hardness | Abrasion loss g. | Mooney compounded MS 1½ |
|---|---|---|---|---|---|---|---|---|---|---|---|---|---|---|---|---|---|
| 5 | Dresinate 214 | 15 | 1 | 0.23 | 2.0 | 2.2 | 13.6 | 2,250 | 3,480 | 435 | 1,570 | 53.4 | 62.3 | 7.2 | 65 | 3.44 | 36 |
| 10 | do | 5 | 1 | 0.19 | 1.75 | 2.0 | 14.4 | 1,810 | 3,240 | 470 | 1,550 | 57.1 | 58.7 | 12.1 | 64.5 | 4.48 | 34.5 |
| 5 ¹ | do | 5 | 0.3 | 0.81 | 1.75 | 1.8 | 14.8 | 1,800 | 3,320 | 480 | 1,700 | 58.5 | 60.6 | 9.4 | 65 | 5.36 | 34.5 |
| 5 | do | 5 | 1 | 0.71 | 1.75 | 1.8 | 15.6 | 1,800 | 3,300 | 480 | 1,630 | 60.5 | 60.2 | 14.4 | 65.5 | 5.21 | 34 |
| 5 | Marasperse CB | 15 | 1 | 0.35 | 1.75 | 2.0 | 21.0 | 1,760 | 3,010 | 515 | 1,580 | 67.6 | 55.8 | 28.8 | 69 | 7.05 | 36 |
| OVEN AGED 24 HOURS AT 212° F. | | | | | | | | | | | | | | | | | |
| 5 | Dresinate 214 | 15 | 1 | 0.23 | 2.0 | 2.2 | | 3,100 | 3,400 | 330 | | 47.6 | 66.0 | 1.7 | 71 | 3.46 | |
| 10 | do | 5 | 1 | 0.19 | 1.75 | 2.0 | | 2,680 | 3,040 | 340 | | 53.7 | 62.5 | 2.5 | 70 | 4.40 | |
| 5 | do | 5 | 0.3 | 0.81 | 1.75 | 1.8 | | 2,650 | 3,230 | 370 | | 52.1 | 65.2 | 1.9 | 68.5 | 4.75 | |
| 5 | do | 5 | 1 | 0.71 | 1.75 | 1.8 | | 2,700 | 3,040 | 340 | | 54.1 | 64.3 | 2.4 | 71 | 4.60 | |
| 5 | Marasperse CB | 15 | 1 | 0.35 | 1.75 | 2.0 | | 2,700 | 2,920 | 330 | | 57.5 | 61.9 | 1.2 | 75 | 6.00 | |

¹ Control.
² Differential coagulation index. 0=complete homogeneity. 1=complete separation of black and rubber.
³ Thousands of flexures to failure.

dium hydroxide were below that called for in the present invention. Photograph 4, corresponding to run 4, has an amount of sodium hydroxide in the preferred range but has an emulsifier level below that called for by us. Examination of photographs 3 and 4 shows large agglomerations of the carbon black particles. Photograph 5 shows a masterbatch which was made using sodium lignin sulfonate as the dispersant for the black slurry. The photograph shows non-uniform coagulation occurred and evaluation of this polymer showed that the material was poorer in physical properties than the other runs.

The second series of photographs number 6 through 10 were made with an ordinary microscope at a magnification of 400 using specimens one micron in thickness. These correspond to photographs 1 through 5, photographs 6 and 7 being the examples of our invention and photographs 8 through 10 showing difficulties encountered when operating according to the prior art methods. The improved uniformity of product is readily apparent in photographs 6 and 7. In photographs 7, 8, and 6, the masterbatch does not completely fill the viewing area and a portion of the embedding plastic is shown. The masterbatch is the central portion extending downwardly to the right in 6, and the large portion to the right and bottom of 7 and 8.

The masterbatches were evaluated in the following tread recipe:

The curing system in all runs was adjusted to give comparable compounded Mooney viscosity and hardness. On this basis it will be seen that the first two runs, using the masterbatches prepared according to the invention, exhibit a very much lower abrasion loss than the other runs; also, heat buildup and compression set are lower, while other significant properties are comparable.

EXAMPLE II

Two runs were made to prepare butadiene/styrene copolymer latex (rubber containing twenty weight percent bound styrene) by emulsion polymerization at 41° F. using the following sugar-free, iron-activated, rosin soap emulsified recipe.

| | Parts by weight |
|---|---|
| Water | 180 |
| Butadiene | 72 |
| Styrene | 28 |
| Dresinate 214, K salt | 4.5 |
| KOH | 0.1 |
| KCl | 0.4 |
| Daxad 11¹ | 0.1 |
| K₄P₂O₇ | 0.165 |
| FeSO₄·7H₂O | 0.139 |
| p-Menthane Hydroperoxide | 0.095 |
| tert-Dodecyl mercaptan | 0.22, 0.19 |

¹ Sodium salt of the condensation product with formaldehyde of a short chain-alkylnaphthalene sulfonic acid.

The first batch attained a conversion of 58 percent and the rubber had a Mooney value (ML-4) of 38. The second batch attained a conversion of 61 percent and the rubber had a Mooney value of 65. The latices were blended to give a rubber having a Mooney value of 52, which was used for the preparation of latex-carbon black masterbatches. The carbon black slurries were prepared with high abrasion furnace black (Philblack O) using variable amounts of rosin soap (Dresinate 214) and KOH. No difficulty with foaming was encountered in the preparation of these carbon black slurries. Masterbatches were prepared to contain 50 parts by weight of black per 100 parts of rubber. The differential coagulation index was obtained for each masterbatch. A 0.5 weight percent solution of sulfuric acid was used as the coagulant. Results were as follows, run 4 representing the process of our invention.

a solids content in the range between 8 and 20, preferably between 10 and 15, weight percent are prepared by this process.

The rosin soaps employed in the production of the carbon black slurries are generally prepared from rosin acids by treatment with an alkali metal hydroxide, preferably sodium hydroxide, or potassium hydroxide although other alkali metal hydroxides, i.e., lithium, rubidium, and cesium hydroxides, can be employed as well as ammonium hydroxide. The rosin acids can be obtained from any source, for example, from wood, gums, etc., and can be used as such or treated in various ways to effect purification. Broadly, they are the natural rosin acids and disproportionation reaction products thereof having the same number of carbon atoms per molecule and the same arrangement of carbon atoms as the natural rosin acids. The disproportionated rosin acids, that is, rosin acids

| Run | Rosin soap | | KOH | | Slurry preparation | | | Black in M.B. phr. | Parts dispersant in black used (phr.) | Parts dispersant per 100 parts rubber plus black | Parts KOH per 100 parts rubber plus black | DCI of M.B. |
|---|---|---|---|---|---|---|---|---|---|---|---|---|
| | In poly. recipe | Phr. | In poly. recipe | Phr. | Dispersant agent | | KOH phb. | | | | | |
| | | | | | Type | Phb. | | | | | | |
| 1 | 4.5 | 7.4 | 0.1 | 0.16 | Dresinate 214 | 5 | 0.2 | 50 | 2.5 | 6.6 | 0.17 | 0.86 |
| 2 | 4.5 | 7.4 | 0.1 | 0.16 | do | 5 | 1 | 50 | 2.5 | 6.6 | 0.44 | 0.70 |
| 3 | 4.5 | 7.4 | 0.1 | 0.16 | do | 15 | 0.2 | 50 | 7.5 | 9.9 | 0.17 | 0.59 |
| 4 | 4.5 | 7.4 | 0.1 | 0.16 | do | 15 | 1 | 50 | 7.5 | 9.9 | 0.44 | 0.24 |
| 5 | 4.5 | 7.4 | 0.1 | 0.16 | Dresinate 731 [1] | 5 | 1 | 50 | 2.5 | 6.6 | 0.44 | 0.70 |

[1] Sodium salt of a disproportionated rosin acid.

A comparison of run 4 with run 3 wherein the rosin soap is constant but wherein the potassium hydroxide is below the range set forth in the claims shows that the good coagulation is not obtained when an amount of potassium hydroxide lower than that claimed is used. Runs 2 and 5, compared with run 1, indicate the deleterious effect on the coagulation of employing the caustic in amounts lower than the range of the invention, although all three of these runs gave poor results since the dispersant was only 6.6 parts, i.e., well below the minimum according to the invention.

The remainder of the examples illustrate the advantages of that aspect of the invention comprising preparing a carbon black slurry using a rosin acid soap as the dispersing agent, which method results in little or no foaming during the preparation. Any foam which is produced when operating in accordance with the process is gradual and easily broken by agitation. The process involves the use of large quantities of rosin acid soap in combination with a specified minimum amount of alkali metal or ammonium hydroxide as compared with prior art processes. As previously stated the carbon black slurry of the invention contains at least 5 parts by weight of a rosin acid soap and at least 0.2 part by weight of an alkali metal or ammonium hydroxide, preferably at least 0.3 part by weight, per 100 parts of carbon black. Usually, the amount of rosin acid soap will not exceed 15 parts by weight and the amount of caustic employed will not be more than 1.5 parts by weight per 100 parts of black.

The carbon black slurries are prepared by dissolving the caustic and rosin soap in the water used in the slurry recipe and then adding the carbon black. In some instances a portion of the water is used originally, say 25 percent or more, and the remainder added after addition of the black has been started. Addition of the black may be accomplished in several ways. It can be added rapidly in one portion, it can be continuously discharged from a micropulverizer, or it can be added in two or more increments. The mixture is subjected to mild agitation during addition of the black and for a sufficient period afterward to insure complete wetting of the black and give a slurry having a constant solids content. Black slurries having treated in such a way that selective dehydrogenation and hydrogenation occur, are particularly effective. Specific examples of rosin acid components which are applicable are abietic acid and dehydro-, dihydro-, and tetrahydroabietic acids. Materials found to be particularly effective are the potassium salt of tetrahydroabietic acid and mixtures of potassium salts of dehydro-, dihydro-, and tetrahydroabietic acids.

While any type of carbon black can be employed for preparing the slurries in accordance with this process, furnace black slurries are often preferred for masterbatching with a synthetic rubber latex.

In preparing the carbon black slurries the temperature of the water employed for the preparation is usually in the range between 60 and 160° F. Room temperature is ordinarily employed.

Two series of tests for mixing rosin acid soap-carbon black slurries under severe conditions tending to promote foaming were effected in order to measure, on the one hand, the effect of the variation in caustic level at a constant rosin acid soap level, and, on the other hand to measure the effect of variation in rosin acid soap level at a constant caustic to rosin soap ratio. These tests and the results thereof are set forth, respectively, in Examples III and IV. In both series of runs about 580 parts of water were employed for each 100 parts of carbon black. The water, carbon black, rosin acid soap, and potassium hydroxide were introduced into a cylindrical glass tube containing about 6 inches of the mixture. Air for mixing and agitation was introduced into the bottom of the glass tube at a constant pressure of 2 centimeters of mercury through a ⅛ inch orifice. In the tables of each of Examples III and IV the amount of rosin acid soap and potassium hydroxide are given in parts by weight per 100 parts of carbon black. In each of the runs the rosin acid soap used was the potassium salt of disproportionated rosin acid.

EXAMPLE III

In these runs, the rosin acid soap level was held at a constant value, while the amount of potassium hydroxide was varied as shown in the table below.

Slurry data

| Run No | 1 | 2 | 3 | 4 | 5 | 6 |
|---|---|---|---|---|---|---|
| Potassium hydroxide | 0.0465 | 0.465 | 0.6975 | 0.930 | 1.1625 | 1.395 |
| pH | 8.9 | 11.0 | 11.6 | 11.7 | 12.0 | 12.3 |
| Brookfield viscosity, cp | 2,500 | 275 | 175 | 75 | 105 | 100 |
| Soap solution volume, ml | 850 | 850 | 850 | 850 | 850 | 850 |
| Slurry volume, ml | | 1,060 | 1,400 | 1,300 | 1,300 | 1,200 |
| Foaming time, seconds | 5 | 25 | 28 | 30 | | |

The foaming time shown in the table was the time for foam to rise 30 inches by bubbling air at a constant pressure into the glass tube containing the slurry mixture. The Brookfield viscosity was determined on each of the finished slurries. In FIGURE 3 the results of this table are plotted, and illustrate the value of using a caustic level of 0.2 or above, preferably 0.3 or above. It is preferred that the slurries, for best handling have a Brookfield viscosity of less than 800 centipoises, preferably less than 500 centipoises.

EXAMPLE IV

In this example, while holding the caustic level constant in relation to the amount of the rosin acid soap, the amount of rosin acid soap was varied as shown in the table below. About 0.19 part by weight of potassium hydroxide were employed for each part by weight of rosin acid soap.

Slurry data

| Run No | 1 | 2 | 3 |
|---|---|---|---|
| Rosin acid soap, parts | 5.0 | 6.0 | 7.0 |
| pH | 11.7 | 12.2 | 12.2 |
| Brookfield viscosity, cp | 75 | | 36 |
| Soap solution volume, ml | 850 | 830 | 860 |
| Slurry volume, ml | 1,300 | 1,540 | 1,500 |
| Foaming time, seconds | 30 | 43 | 45 |

From this table and FIGURE 4, which shows this data in graphical form, it will be seen that increasing the amount of rosin acid soap decreases the tendency to foam and also decreases the viscosity of the slurry.

EXAMPLE V

A carbon black slurry was prepared according to the following recipes; the amounts given are parts by weight:

| | |
|---|---|
| Water | 603 |
| Philblack O (micropulverized) | 100 |
| Disproportionated rosin acid, potassium salt | 7.03 |
| KOH | 1.01 |
| Solids content | 15.1 |
| Brookfield viscosity, cps | 125 |

The slurry was prepared in a 1000 gallon slurry make-up tank, equipped with two 26-inch diameter 5-blade turbine impellers. The KOH and rosin acid soap were dissolved in the water in the tank and then the black was added in increments, with stirring. The black was wetted without difficulty and no trouble with foaming was encountered. The measured solids content shown in the foregoing table coincided with theoretical value. The viscosity of the finished slurry 125 centipoises was well below the preferred maximum of 500 centipoises.

As will be evident to those skilled in the art, various modifications of this invention can be made or followed in the light of the foregoing disclosure and discussion without departing from the spirit or scope of the disclosure or from the scope of the claims.

We claim:

1. A method for preparing a carbon black slurry which comprises mixing with agitation carbon black and water containing, per 100 parts by weight of carbon black, at least 5 parts of a rosin acid soap and at least 0.2 part of a base selected from the group consisting of the alkali metal and ammonium hydroxides.

2. A method for preparing a carbon black slurry which comprises mixing with agitation carbon black and water containing, per 100 parts by weight of carbon black, at least 5 parts of a rosin acid soap and at least 0.3 part of a base selected from the group consisting of the alkali metal and ammonium hydroxides.

3. A method for preparing a carbon black slurry consisting essentially of carbon black, water, rosin acid soap, and a base selected from the group consisting of the alkali metal and ammonium hydroxides, which comprises mixing with agitation carbon black and water containing, per 100 parts by weight of carbon black, from 5 to 15 parts of said rosin acid soap and from 0.3 to 1.5 parts of said base.

4. A method for preparing a carbon black slurry consisting essentially of carbon black, water, rosin acid soap, and a base selected from the group consisting of the alkali metal and ammonium hydroxides, which comprises mixing with agitation carbon black and water containing, per 100 parts by weight of carbon black, at least 5 parts of said rosin acid soap and at least 0.2 part of said base, the amount of water employed being sufficient to give a carbon black slurry having a solids content in the range from 8 to 20 weight percent.

5. A carbon black slurry of low foaming tendencies comprising carbon black, water, and, per 100 parts by weight of carbon black, at least 5 parts of a dispersing agent consisting essentially of a rosin acid soap and at least 0.2 part of a base selected from the group consisting of the alkali metal and ammonium hydroxides.

6. A carbon black slurry of low foaming tendencies consisting essentially of carbon black, water, and, per 100 parts by weight of carbon black, at least 5 parts of a rosin acid soap and at least 0.3 part of a base selected from the group consisting of the alkali metal and ammonium hydroxides.

7. A carbon black slurry of low foaming tendencies consisting essentially of carbon black, water, and, per 100 parts by weight of carbon black, at least 5 parts of a rosin acid soap and at least 0.3 part of a base selected from the group consisting of the alkali metal and ammonium hydroxides, the amount of water present being sufficient to give a carbon black slurry having a solids content in the range from 8 to 20 weight percent.

8. A carbon black slurry of low foaming tendencies consisting essentially of carbon black, water, and, per 100 parts of weight of carbon black, from 5 to 15 parts of a rosin acid soap and from 0.3 to 1.5 parts of a base selected from the group consisting of the alkali metal and ammonium hydroxides, the amount of water present being sufficient to give a carbon black slurry having a solids content in the range from 8 to 20 weight percent.

9. A carbon black slurry according to claim 8 wherein said base is an alkali metal hydroxide.

10. A carbon black slurry according to claim 8 wherein said base is potassium hydroxide.

11. A carbon black slurry according to claim 8 wherein said base is ammonium hydroxide.

References Cited in the file of this patent

UNITED STATES PATENTS

| | | |
|---|---|---|
| 2,050,193 | Park | Aug. 4, 1936 |
| 2,635,057 | Jordan | Apr. 14, 1953 |
| 2,784,165 | Howland | Mar. 5, 1957 |
| 2,794,749 | Schultze | June 4, 1957 |
| 2,809,179 | Endres et al. | Oct. 8, 1957 |
| 2,867,540 | Harris | Jan. 6, 1959 |
| 2,871,216 | Anderson | Jan. 27, 1959 |
| 2,894,924 | Rockoff | July 14, 1959 |
| 2,908,586 | Braendle | Oct. 13, 1959 |
| 2,955,096 | White | Oct. 4, 1960 |